United States Patent
Hong et al.

(10) Patent No.: US 8,384,559 B2
(45) Date of Patent: Feb. 26, 2013

(54) SENSOR DEVICE WITH FLEXIBLE INTERFACE AND UPDATABLE INFORMATION STORE

(75) Inventors: William Hong, Austin, TX (US); Jeff Gokingco, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 126 days.

(21) Appl. No.: 12/849,815

(22) Filed: Aug. 4, 2010

(65) Prior Publication Data
US 2011/0248865 A1    Oct. 13, 2011

Related U.S. Application Data

(60) Provisional application No. 61/323,798, filed on Apr. 13, 2010.

(51) Int. Cl.
*G08B 29/14* (2006.01)
(52) U.S. Cl. ......... 340/870.16; 340/870.07; 340/870.39; 340/539.3
(58) Field of Classification Search .............. 340/870.39, 340/3.1, 3.3, 3.31, 3.32, 10.1, 10.34, 693.2, 340/693.3, 870.16, 870.07, 539.3; 702/150; 324/153
See application file for complete search history.

(56) References Cited

U.S. PATENT DOCUMENTS

| | | | |
|---|---|---|---|
| 5,864,591 A | 1/1999 | Holcombe | |
| 6,198,118 B1 | 3/2001 | Holcombe | |
| 7,486,386 B1 | 2/2009 | Holcombe | |
| 7,714,674 B2 | 5/2010 | Guo | |
| 8,098,143 B2 * | 1/2012 | Andarawis et al. | 340/425.5 |
| 2006/0217920 A1 | 9/2006 | May | |
| 2010/0302028 A1 * | 12/2010 | Desai et al. | 340/539.3 |

OTHER PUBLICATIONS

Chung—"Modeling and Analysis of Energy Conservation Scheme Based on Duty Cycling in Wireless Ad Hoc Sensor Network", Sensors, ISSN 1424-8220 (2010).
I2C Bus—"A Faster Way for Data Access", downloaded from www.i2c-bus.org on Jul. 2, 2010.
KALINSKY1—"Introduction to I2C", Embedded Systems Design (Jul. 31, 2001).
KALINSKY2—"Introduction to Serial Peripheral Interface", Embedded Systems Design (Feb. 1, 2002).
Schulz—"A Practical Case Study in Low-Power Design Methodology", NXP Semiconductors (Aug. 2, 2008).

* cited by examiner

*Primary Examiner* — Ryan Johnson (57) ABSTRACT

A sensor device includes an interface that receives a request. The sensor device includes an updatable information store that responds to the request if the request is directed to the updatable information store, the updatable information store being in a first power domain of the sensor device. The sensor device also includes a power manager that activates a sensor element in the sensor device in response to receiving the request if the request is a request for measurement of a parameter by the sensor element. The sensor element is in a second power domain of the sensor device. The sensor element communicates measured parameter information to the updatable information store.

20 Claims, 4 Drawing Sheets

UPDATABLE INFORMATION
STORE
(E.G. REMAPPABLE REGISTER
STORE)

| ADDRESS 1 | DATA 1 |
|---|---|
| ADDRESS 2 | DATA 2 |
| ADDRESS 3 | DATA 3 |
| ⋮ | |
| ADDRESS N | DATA N |

SENSOR DEVICE WITH FLEXIBLE INTERFACE AND UPDATABLE INFORMATION STORE

RELATED PATENT APPLICATIONS

This patent application claims priority to Provisional U.S. Patent Application Ser. No. 61/323,798, filed Apr. 13, 2010, inventors Andreas, et al., entitled "APPARATUS WITH OPTICAL FUNCTIONALITY AND ASSOCIATED METHODS", which is incorporated herein by reference in its entirety.

BACKGROUND

The disclosures herein relate generally to electrical interfaces, and more particularly, to electrical interfaces for sensor devices.

Integrated circuit sensor devices may sense or measure a number of different physical parameters. These sensor devices may include proximity sensors, voltage and current sensors, capacitance and resistance sensors, accelerometers, gyroscopic inertial sensors, pressure sensors, humidity sensors, chemical sensors, sound sensors and vibration sensors, for example. An integrated circuit sensor may couple via an electrical interface to a system host controller or host processor that instructs the sensor to take readings of a particular measured parameter. The electrical interface conveys commands from the host processor to the sensor and returns data from the sensor to the host processor.

BRIEF SUMMARY

In one embodiment, the disclosed sensing method includes receiving, by an interface in a sensor device, a request. The method also includes responding to the request, by an updatable information store in the sensor device, if the request is directed to the updatable information store. The updatable information store is located in a first power domain of the sensor device. The method further includes activating, by a power manager in the sensor device, a sensor element in the sensor device in response to receiving the request if the request is a request for measurement of a parameter by the sensor element. The sensor element is located in a second power domain of the sensor device. The sensor element communicates measured parameter information to the updatable information store.

In another embodiment, a sensor device is disclosed that includes an interface that receives requests. The sensor device also includes an updatable information store, coupled to the interface, and situated in a first power domain. The updatable information store responds to a request if the request is directed to the updatable information store. The sensor device also includes a sensor element, situated in a second power domain of the sensor device, that communicates measured parameter information to the updatable information store. The sensor device further includes a power manager that activates the second power domain in response to receiving the request if the request is a request for measurement of a parameter by the sensor element.

In another embodiment, a sensor system is disclosed that includes a host processor. A bus couples to the host processor to transport requests and information for the host processor. The sensor system also includes a sensor device coupled to the bus. The sensor device includes an interface that receives requests. The sensor device also includes an updatable information store, coupled to the interface, and situated in a first power domain. The updatable information store responds to a request if the request is directed to the updatable information store. The sensor device also includes a sensor element, situated in a second power domain of the sensor device, that communicates measured parameter information to the updatable information store. The sensor device further includes a power manager that activates the second power domain in response to receiving the request if the request is a request for measurement of a parameter by the sensor element.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, the disclosed sensor integrated circuit (IC) includes a bus interface that couples to a host processor. The sensor IC includes a sensor element that measures a particular parameter. The host processor sends requests to the sensor IC via the bus interface. The sensor IC includes an updateable information store, such as a remappable register store, that holds sensor configuration information as well other information employed in sensor operation. In one embodiment, the sensor IC is portioned into an always accessible power domain and a sleep/active power domain. The sleep/active power domain includes the sensor element. The sleep/active power domain is active to take sensor element readings for the host processor, but may otherwise sleep to conserve power. The always accessible power domain includes the bus interface, a remappable register store and power management unit (PMU) that are always accessible and ready to perform requested actions. The always accessible power domain enables the host processor to access and/or update information in the remappable register store at any time without waking up the sleep/active power domain that includes the sensor element. While a portion or portions of the always accessible power domain may be deactivated at times, the always accessible power domain is still accessible. In this manner substantial power may be conserved while still providing the host processor with full access to information in the remappable register store at any time.

Figure 1:
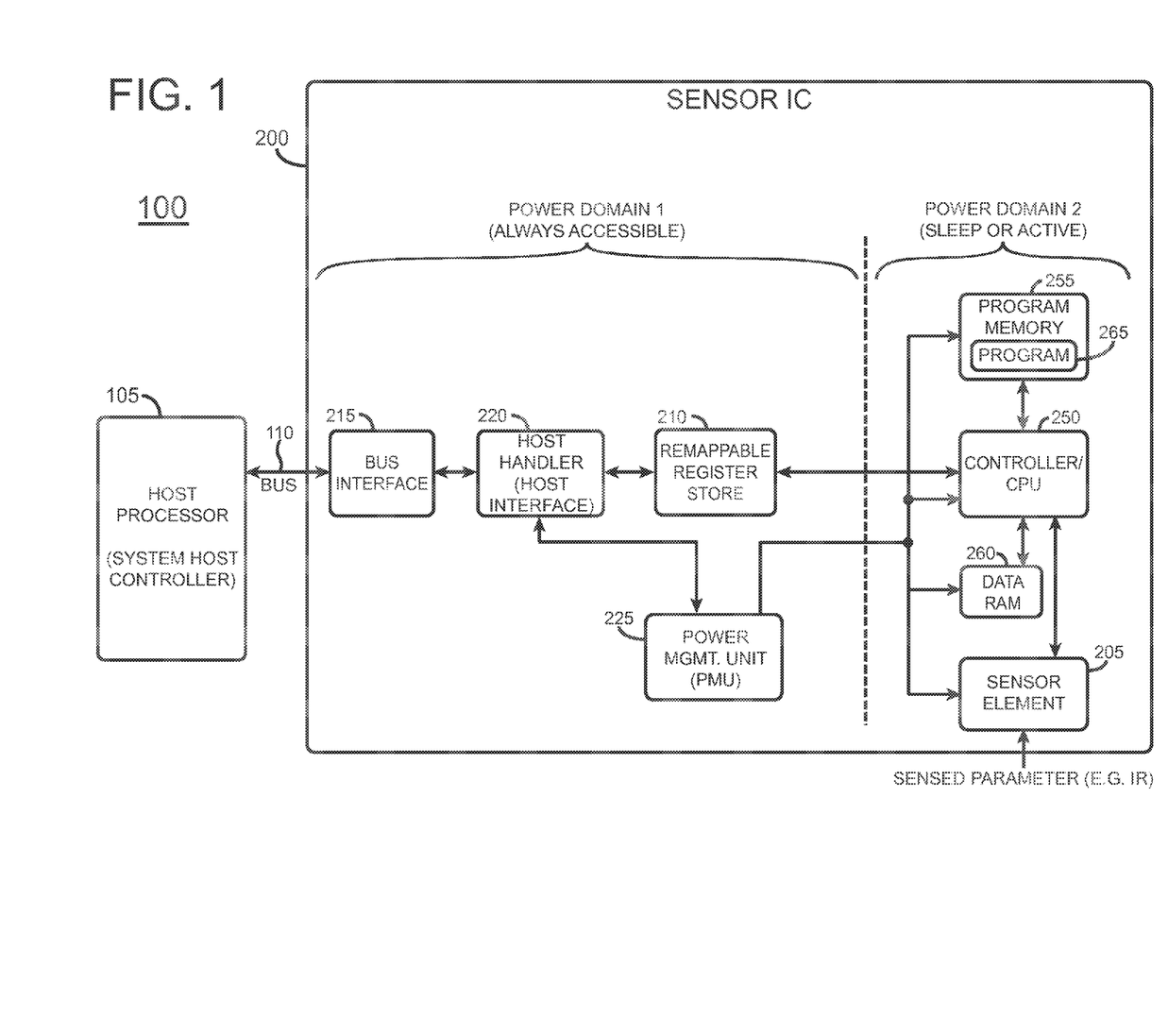
FIG. 1 is a simplified block diagram of one embodiment of the disclosed sensor system.

FIG. 1 depicts a simplified block diagram of one embodiment of a sensor system 100 that includes a host processor 105 that couples to a sensor IC 200. Host processor 105 may also be referred to as a system host controller. Sensor IC 200 includes a sensor element 205 that measures a particular parameter, such as ambient light level or infrared light level. The disclosed apparatus and methodology applies as well to other types of sensor elements. For example, sensor element 205 may be a voltage sensor, current sensor, capacitance sensor, resistance sensor, accelerometer, gyroscopic inertial sensor, pressure sensor, humidity sensor, chemical sensor, sound sensor, vibration sensor, wind speed sensor, as well as many other types of sensors. A characteristic of sensor element 205 is that it measures a particular parameter and reports a measurement of that parameter to other circuitry.

Host processor 105 sends requests to sensor IC 200 for sensor IC 200 to perform operations such as taking parameter measurements. Sensor element 205 performs the requested sensor measurements under the direction of a control program such as control program 265. Host processor 105 may also send requests to sensor IC 200 to access and update configuration information. An updatable information store 210 such as a remappable register store holds configuration information and other information to which host processor 105 may request access via a bus interface 215 and host handler 220.

Sensor IC 200 includes an always accessible power domain 1 that includes bus interface 215, host handler 220, remappable register store 210 and a power management unit (PMU) 225 coupled together as shown in FIG. 1. PMU 225 acts as a power manager for sensor IC 200. Sensor IC 200 also includes a sleep/active power domain 2 that includes sensor element 205 that couples to a controller/CPU 250. This controller may be a controller or CPU, but for convenience is referred to as controller/CPU 250. Controller/CPU 250 couples to a program memory 255 and an optional data random access memory (RAM) 260. Program memory 255 includes a control program 265 that governs the operation of sensor IC 200 and the collection of information by sensor element 205.

PMU 225 maintains the components of power domain 1 in an always accessible state. In another embodiment, sensor IC 200 may maintain the components of power domain 1 in the always accessible state independent of PMU 225. In either case, being situated in the always accessible power domain 1, the following components achieve the following functions: 1) bus interface 215 is always accessible and ready to receive requests from, and transmit information back to, host processor 105; 2) host handler 220 is always accessible and available to perform functions such as detecting a wakeup command from host processor 105; and 3) remappable register store 210 is always accessible and available for host processor 105 to access, read, write or otherwise manipulate configuration information or other data and information therein. To conserve power, the components of power domain 1 may be implemented with high transition voltage (Vt) semiconductor devices.

In power domain 1, bus interface 215 couples via bus 110 to host processor 105. Host processor 105 sends requests to sensor IC 200 via bus 110. Bus 110 is external to sensor IC 200 and thus may be regarded as an external bus. Bus 110 couples to a bus interface 215 that interprets the particular protocol that bus 110 employs. Host handler 220 couples to bus interface 215 to handle requests received from host processor 105. For example, host handler 220 monitors bus interface 215 for read and write access requests to carry out on remappable register store 210. Host handler 220 also monitors the output of bus interface 215 for a particular wake-up command that wakes up the components of power domain 2 when sensor element 205 is instructed to take a parameter measurement to obtain sensor data. When host handler 220 receives the particular wake-up command from host processor 105, it so informs PMU 225. In response, PMU 225 activates the components of power domain 2 via connections to those components. As seen in FIG. 1, PMU 225 couples to sensor element 205, controller/CPU 250, program memory 255 and data RAM 260 to enable the activation of these power domain 2 components in response to a particular wakeup command. Upon activation of sensor element 205 and receipt of a request to take a parameter reading, sensor element 205 performs a parameter measurement. Controller/CPU 250 receives measured parameter information and sends the measured parameter information to remappable register store 210 for storage. Upon completion of the parameter reading and parameter information transfer to the remappable register store 210, the components of power domain 2, such as sensor element 205 and controller 250, return to the sleep state or inactive state to conserve power. Host processor 105 may retrieve the stored parameter information from remappable register store 210 at any time since power domain 1 is always accessible to service such requests.

Figure 2:
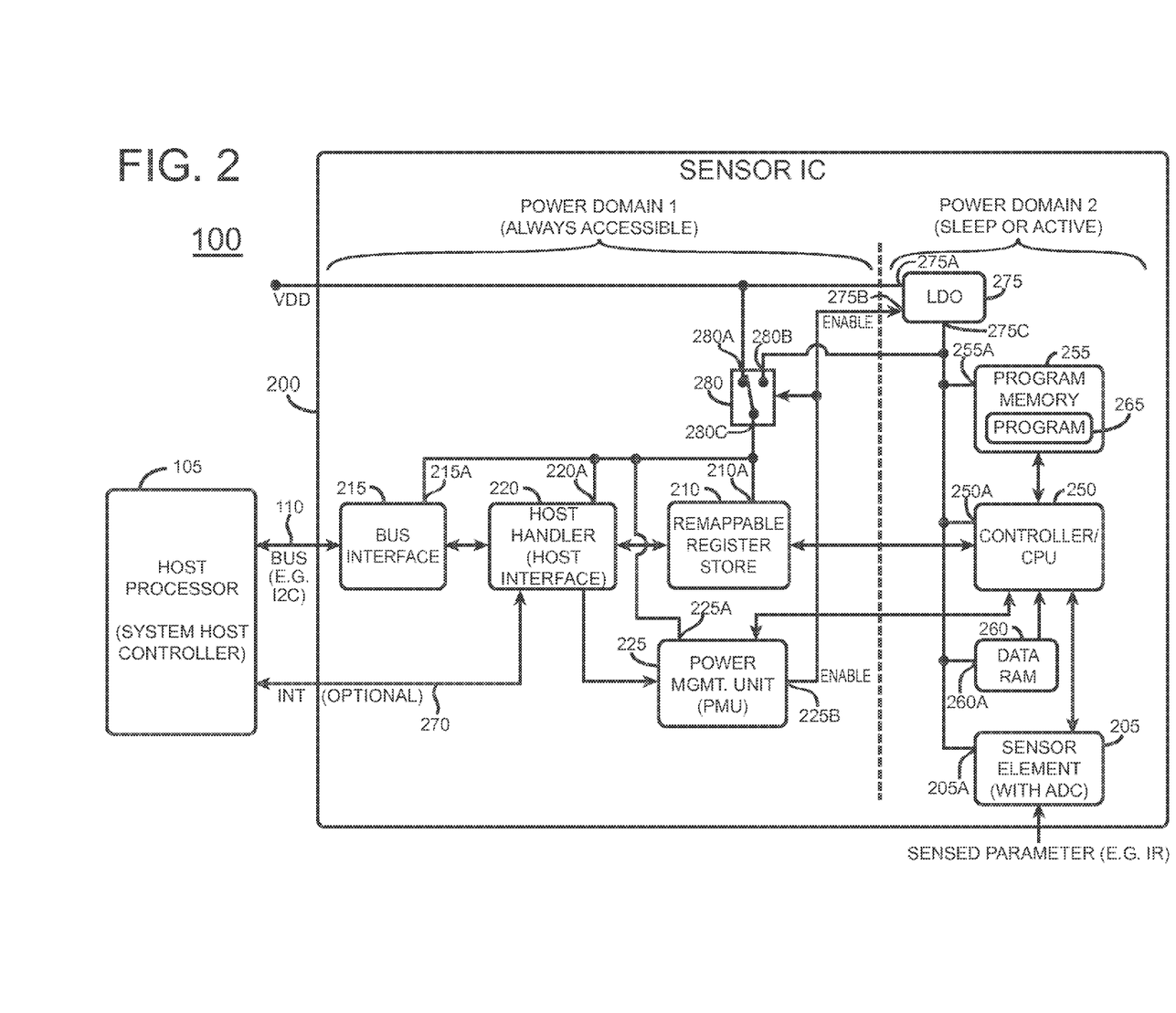
FIG. 2 is a more detailed block diagram of one embodiment of the disclosed sensor system.

FIG. 2 shows a more detailed block diagram of the embodiment of the disclosed sensor system 100. FIG. 2 includes several elements in common with FIG. 1. Like numbers indicate like elements when comparing the system of FIG. 2 with the system of FIG. 1. Host processor 105 couples to sensor IC 200 via a bus 110. Host processor 105 acts as a system host controller that sends requests to, and receives information from, sensor IC 200. These requests include requests to measure parameter information, requests to read information from sensor IC 200 and requests to write configuration information to sensor IC 200 to govern its operation. These requests may also include requests to read, write, access or update configuration information or other information that sensor IC 200 stores.

In one embodiment, bus 110 is a serial bus such as an Inter IC (I2C) bus or a serial peripheral interconnect (SPI) bus, for example. Bus 110 may include a dedicated clock line (not shown). Bus 110 couples to a bus interface 215 that is onboard sensor IC 200. Bus interface 215 implements a physical layer of communication between host processor 105 and sensor IC 200. Bus interface 215 may convert serial information stream from host processor 150 to parallel information in one embodiment. In one embodiment, bus 110 is a shared bus that couples to multiple devices that may desire to access the bus. One function of bus interface 215 is to monitor bus 110 to determine when sensor IC 100 is being addressed. Sensor device 110 may have a particular slave ID or address associated with sensor device 110. Bus interface 215 monitors bus 110 for this particular slave ID or address to determine when host processor 105 desires to access sensor IC 200. In one embodiment, bus interface 215 sends a clock signal derived from bus 110 to clock other components of always accessible power domain 1, such as host handler 220, updatable information store 120 and PMU 225, but does so only in response to detecting a bus transaction addressed to sensor IC 200.

Bus interface 215 couples to host handler 220. Host handler 220 couples to power management unit (PMU) 225 so that host handler 220 may inform PMU 225 when host handler 220 detects a unique wake-up command from host processor 105. The purpose of the wakeup command is to wake-up power domain 2 to enable a sensor reading or other power domain 2 activity. Host handler 220 monitors the information from bus interface 215 to determine when bus interface 215 receives the wake-up command. When host handler 220 detects the wake-up command, host handler 220 informs PMU 225 of this detection. In response, PMU 225 instructs the components of power domain 2 to change from the inactive or sleep state to the active state. With controller/CPU 250 and sensor element 205 now active, controller/CPU 250 and sensor element 205 may now proceed with performing a parameter measurement. When CPU 250 and sensor element 205 complete the parameter measurement, CPU 250 sends parameter information back to remappable register store 210 for storage and PMU 225 instructs the components of power domain 2 to return to the sleep state. Host handler 220 couples to host processor 105 via an optional interrupt line 270 so that host handler 220 may notify host processor 105 when a sensor measurement operation is complete.

In one embodiment, PMU 225 switches the components of power domain 2 from the sleep state to the active state and back to the sleep state in the following manner. The disclosed apparatus and methodology is not limited to this particular implementation of switching between sleep mode and active mode. Sensor IC 200 includes a power source such as a low drop-out (LDO) regulator 275. Sensor IC 200 is configured such that the always accessible power domain 1 receives its power from either external voltage pin VDD or internal LDO 275. A switch 280 facilitates switching between external voltage pin VDD and internal LDO 275. The sleep/active power domain 2 receives its power from LDO 275 when activated, for example to take a parameter reading.

LDO 275 includes an voltage input 275A that couples to external voltage pin VDD, an ENABLE input 275B that couples to an ENABLE output 225B of PMU 225 and further includes a regulated output 275C that couples to the ENABLE output 225B of PMU 225. While in one embodiment power domain 1 may be called the always accessible power domain, power domain 1 is always accessible in the sense that it is configured to be always available for communication with host processor 105. However, power domain 1 is not clocked by bus interface 215 until bus interface 215 receives the particular slave ID or address that is associated with sensor IC 200. In this manner, power domain 1 conserves power during those times when it is not being accessed by host processor 105. Thus, always accessible power domain 1 is clock gated (i.e. gated off) or inactive until addressed by host processor 105. When bus interface 215 detects the slave ID of sensor IC 200 on bus 110, bus interface 215 responds by sending the clock signal from bus 110 to host handler 220, remappable register store 210 and PMU 225, thus activating those components of power domain 1. The clock connections between bus interface 215, host handler 220, remappable register store 210 and PMU 225 are not shown. The components of power domain 1 of sensor IC 200 are now available to respond to requests from host processor 105. Since power domain 1 derives its clock signal from bus 110 without a separate local oscillator in power domain 1, significant power is conserved.

Host processor 105 may send different types of requests to sensor IC 200. For example, host processor 105 may send requests to sensor IC 200 to access the remappable register store 210. Host processor may also send requests to sensor IC 200 to conduct a parameter reading and return parameter information to host processor 105.

In a first scenario, when host processor 105 sends a request to access remappable register store 210 to sensor IC 200, host processor 105 sends the slave ID for sensor IC 200. As described above, bus interface 215 receives the slave ID and starts clocking the components of power domain 1 using a clock signal derived from a clock signal on bus 110. In the embodiment of FIG. 2, switch 280 is configured to supply voltage from external pin VDD to the components of always accessible power domain 1. More particularly, switch input 280A couples to external power pin VDD. Switch output 280C couples to bus interface power input 215A, host handler power input 220A, remappable register store power input 210A and PMU power input 225A. PMU 225 generates an ENABLE signal at ENABLE output 225B that instructs switch 280 to couple switch input 280A to switch output 280C to supply voltage from the external VDD pin to the power domain 1 components. With remappable register store 210 now clocked and active in the always available power domain 1, sensor IC 200 responds to the incoming request from host processor 105. If the request is a write request, then sensor IC 200 writes data associated with the request to the particular address in remappable register store 210 that the write request specifies. For example, the write request may include configuration information for sensor IC 200 to write to a location within remappable register store 210. However, if the request is a read request, then sensor IC 200 reads data from the particular address in remappable register store 210 that the read request specifies. Host handler 220 returns the data from this read operation to host processor 105 via bus interface 215. Remappable register store 210 may be registers, memory or a combination or registers and memory, depending on the particular application.

In a second scenario, when host processor 105 sends a request for sensor element 205 to conduct a parameter reading, host processor 105 sends the slave ID for sensor IC 200 in the request. If always accessible power domain 1 is not currently being clocked, then bus interface 215 commences clocking the components of power domain 1 in response to detecting the slave ID of sensor IC 200. After sending the slave ID, host processor 105 sends a predetermined wake-up command or code to sensor IC 200. When host handler 220 receives the predetermined wake-up command, host handler 220 informs PMU 225 which in response sends an ENABLE signal to instruct LDO 275 to generate output voltage at LDO output 275A. The same ENABLE signal instructs switch 280 to couple switch input 280B to switch output 280C. In this manner, LDO 275 provides internally regulated voltage to the components of power domain 1, namely bus interface 215, host handler 220, remappable register store 210 and PMU 225. In response to the wake-up command and the resultant ENABLE signal, LDO 275 also supplies power to the components of sleep/active power domain 2, namely sensor element 205, controller/CPU 250, program memory 255 and data RAM 260. More particularly, LDO output 275C provides power to controller/CPU power input 250A, sensor element power input 205A, data RAM power input 260A and program memory power input 255A. Providing power in this manner changes the components of sleep/active power domain 2 from the sleep state to the active state during which a parameter reading may be taken by sensor element 205.

The following discusses the wake-up command in more detail. Along with, or as part of, the request for a parameter reading that host processor 215 sends to sensor IC 200, host processor 205 sends a wake-up command to sensor IC 200. For example, host processor 105 may send a particular value to a particular address in remappable register store 210. In one embodiment, sensor IC 200 does not respond to a request for a parameter measurement unless the particular value is written to the particular address in remappable register store 210. In this manner, a two stage test is provided by the wake-up command before activation of power domain 2. In other words in one embodiment, to trigger power domain 2 activation by PMU 225, the wake up command should be directed to a particular address in remappable register store 210 and the command should to write a particular value at the particular address in remappable register store 210. Other embodiments may use different wake-up command arrangements to determine when to activate sleep/active power domain 2 for sensor element 205 to respond to a request for a parameter reading. In an alternative embodiment, instead of directing a particular command to a particular address location as a wake-up command, a wake-up command may be embedded in the address itself that is sent by host processor 105 to sensor 200 as part of a request. For example, in the address depicted in FIG. 4, bit 7 may be used as a wake-up bit. If host handler 220 determines that this wake-up bit is set in the address of a request received from host processor 105, then host handler 220 signals PMU 225 to wakeup and activate controller/CPU 250 of power domain 2.

Upon entering the active state from the sleep state after receiving power from LDO 275 in response to the wake-up command, controller/CPU 250 processes the request to take a parameter reading under the control of control program 265 in program memory 255. Sensor element 205 takes the parameter reading. An analog to digital converter (ADC) in sensor element 205 converts the raw analog parameter reading to digital parameter information that sensor element 205 supplies to controller/CPU 250. Controller/CPU 260 may store the digital parameter information in data RAM 260. Controller/CPU 260 may also send the digital parameter information to remappable register store 210 where it is stored at a particular address. Remappable register store 210 may transmit this digital parameter information back to host processor 105 via bus interface 215 at this time. Alternatively, host processor 105 may retrieve the digital parameter information stored in remappable register store 210 at this address at a later time.

In this manner, remappable register store 210 provides a way to transmit requested parameter information back to host processor 105. Remappable register store 210 also provides a flexible way to provide updatable configuration information for controller/CPU 250 and sensor IC 200. Host processor 105 may write configuration information to remappable register store 210 that completely or partially specifies the behavior and operations performed by controller/CPU 250. This configuration information may specify the performance of control program 265 by providing configuration information to program 265, overwriting code of program 265 or replacing all or a portion of control program 265. Controller/CPU 250 accesses the information written by host processor 105 in remappable register store 210 to carry out such configuration changes and updates. In one embodiment, program memory 255 is non-volatile memory and control program 265 is firmware. By providing new configuration information to remappable register store 210, host processor 105 may update the control program firmware 265. In this manner, host processor 105 may write configuration or other information to updatable information store 210 to update the information therein. This updated information in updatable information store 210 may modify or replace the control program 265 in program memory 255 to effectively alter bus interface 215 as perceived by host processor 105. This action may provide host interface 105 with a different register map or set of commands to employ when communicating with sensor device 200.

In one embodiment, host handler 220, remappable register store 210, and controller/CPU 250 work together to provide a flexible, byte-level interface on top of the serial interface that bus interface 215 provides. Host handler 220 presents the registers or address space of remappable register store 210 to host interface 105 so that host processor 105 may write to or read from these registers or address locations by address. These same register or address locations are available to CPU/controller 250 through the register map provided by remappable register store 210. Since these registers or address locations are not hard-coded for a particular purpose, the interpretation of their function as seen by host processor 105 and controller/CPU 250 may be modified. Controller/CPU 250 may be customized by loading a memory image into non-volatile or program memory 255. Different images may map to different registers in remappable register store 210. Different images may also allow controller/CPU 250 to implement different or all new commands. From the perspective of host processor 105, host processor 105 desires matching documentation of register functions and commands. In this manner, the same physical circuitry in sensor IC 200 may be used to fit different system requirements.

Figure 3:
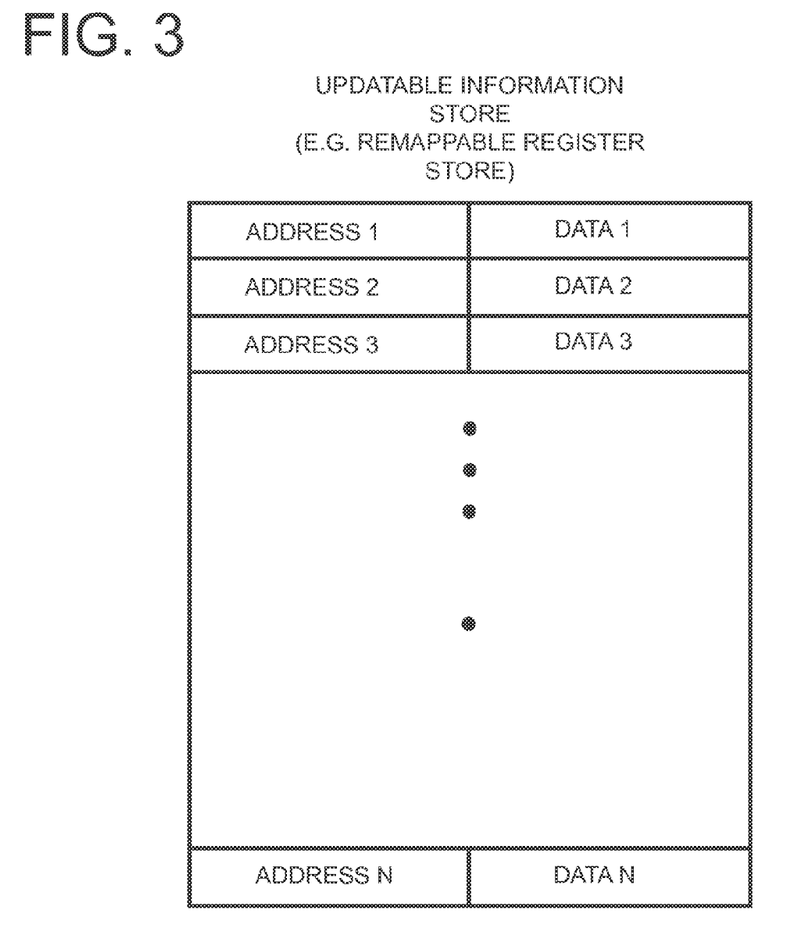
FIG. 3 is representation of an updatable information store in the disclosed sensor system.

FIG. 3 is a representation of an updatable information store 210 such as a remappable register store. The updatable information store 210 may include registers, memory or a combination of registers and memory. Store 210 includes address locations or cells 1, 2, 3, . . . N, wherein N is the total number of address locations in store 210. Data values DATA 1, DATA 2, DATA 3, . . . N represent respective data values stored in address locations 1, 2, 3, . . . N, respectively.

Figure 4:
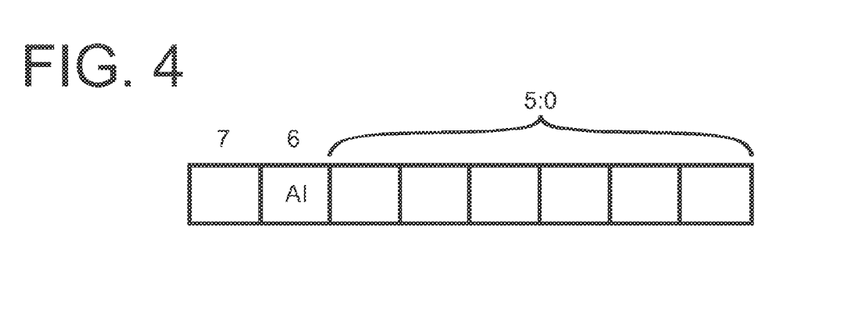
FIG. 4 is a representation of an address location with an auto-increment control bit employed in one embodiment of the disclosed sensor system and methodology.

FIG. 4 is a representation of a particular address location of host handler 220 that stores a value that may trigger an auto-increment addressing function in sensor IC 200. In this manner, sensor IC 200 may respond to an auto-increment request, as described in more detail below. In one particular embodiment, bit location 6 stores a value AI, which is a value that triggers the auto-increment addressing function. Other bit locations or methods may be used to trigger the auto-increment addressing function. In this particular example, bit location 6 is a control bit embedded in the address in a request that host processor 105 sends to sensor IC 200. The value of this control bit determines whether host handler 220 should auto-increment its register address. If the control bit AI is set to 0, then host handler 220 will increment the address of the request after a read or write access request by host processor 105. In other words, if the auto-increment bit is enabled, then host handler 220 increments the address on every access. This mode allows for efficient burst data writes or reads because host processor 105 only has to send an auto-increment request including a starting address followed by one or more bytes of data. However, if the auto-increment bit is disabled, i.e. if AI is set to 1, then the auto-increment function is disabled. This mode allows for repeated polling of the same register in remappable register store 210 without having to resend the address on the serial interface bus 110. The address that FIG. 4 depicts may alternatively employ a number of bits other than the 8 bits shown in this particular example. Alternatively, the AI bit may be set in a different register than shown in FIG. 4 or may be in a location other than an address.

Figure 5:
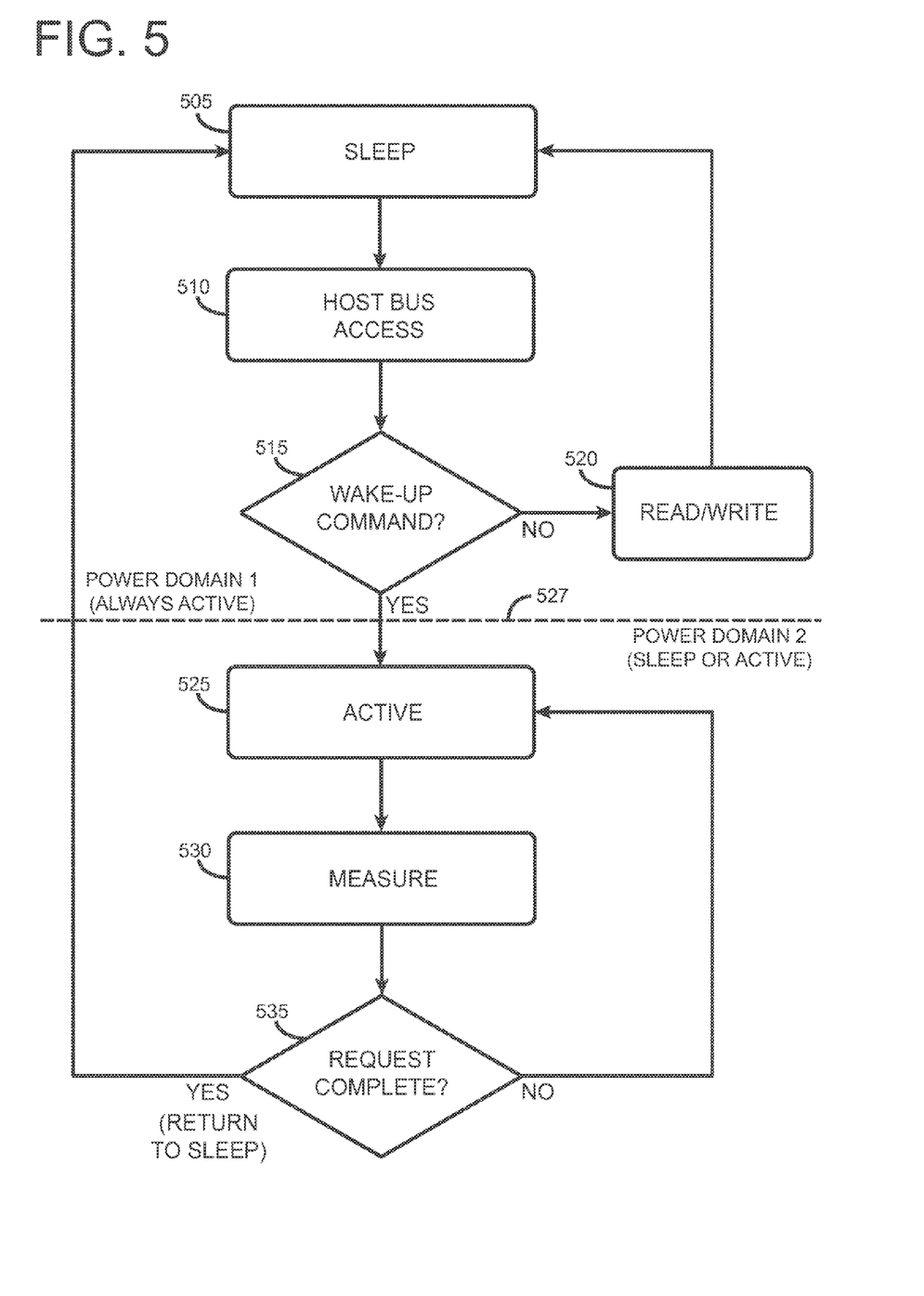
FIG. 5 is a flowchart that depicts process flow in a representative embodiment of the disclosed sensor system and methodology.

FIG. 5 is a flowchart that depicts process flow in a representative embodiment of the disclosed sensor apparatus and methodology. It is assumed that process flow commences with the sleep/active power domain 2 of FIG. 2 in the sleep state, as per block 500. Host processor 105 may send sensor IC 200 a read access request, a write access request or a sensor measurement request in a host bus access, as per block 510. Read access requests and write access requests are directed to information stored in remappable register store 210. Sensor reading requests are directed to instructing sensor element 205 to obtain a parameter reading. Host handler 215 monitors requests to determine if a request includes a wake-up command, as per decision block 515. For example, sensor measurement requests includes wake-up commands. If host handler 215 does not determine that a particular received request includes a wake-up command, then the request is either a read access request or a write access request. In response to a determination that the request is a read or write access request, sensor IC 200 performs the requested read or write of information in remappable register store 210 without activating the sleep/active power domain, as per block 520. Since, remappable register store 210 is in the always accessible power domain 1, sensor IC 200 is able to respond to read and write access requests without activating the sleep/active power domain 2. After completing the read or write access request, process flow continues back to sleep block 505. The above described read and write access operations are performed in the always accessible power domain 1 as signified by the respective functional blocks being located above dashed line 527 in the flowchart of FIG. 5.

If host handler 220 determines at decision block 515 that a request includes a wake-up command, then the request is a sensor measurement request and in response PMU 225 changes the components of sleep/active power domain 2 from the sleep state to the active state, as per block 525. Controller/CPU 250 takes a measurement from sensor element 205 and stores the measured digital parameter information in data RAM 260 and remappable register store 210, as per block 530. Sensor IC 200 tests to determine if the request or command is complete, as per decision block 535. If the request is not complete, then process flow continues back to active block 525 and sensor IC 200 may take another measurement at block 530. However, if the request or command is complete at decision block 535, then sleep/active power domain 2 returns to the sleep state, as per block 505. In this manner, sensor IC 200 may provide substantial power conservation in power domain 2 while providing ready access to remappable register store 220 in power domain 1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
  receiving, by an interface in a sensor device, a request;
  responding to the request, by an updatable information store in the sensor device, if the request is directed to the updatable information store, the updatable information store being in a first power domain of the sensor device; and
  activating, by a power manager in the sensor device, a sensor element in the sensor device in response to receiving the request if the request is a request for measurement of a parameter by the sensor element, the sensor element being in a second power domain of the sensor device, wherein the sensor element communicates measured parameter information to the updatable information store.

2. The method of claim 1, further comprising:
  maintaining, by the power manager, the sensor element in an inactive state if the request is other than a request for measurement of a parameter by the sensor element.

3. The method of claim 1, further comprising:
  updating configuration information in the updatable information store in response to a request received by the interface.

4. The method of claim 1, wherein the updatable information store is a remappable register store that includes configuration information for the sensor device.

5. The method of claim 4, further comprising:
  responding, by the updatable information store, to an auto-increment request by sending to the interface a block of data starting at an address included in the auto-increment request.

6. The method of claim 1, further comprising:
  controlling, by a controller, the sensor element under direction of a control program in a program memory; and
  modifying, by the controller, the control program in response to updating configuration information in the updatable information store.

7. The method of claim 6, wherein the modifying alters commands to which the sensor device responds thus effectively modifying the interface.

8. The method of claim 1, wherein the first power domain is an always accessible power domain and the second power domain is a sleep/active power domain.

9. The method of claim 1, wherein the interface is configured to operate with an external bus from which the interface receives a clock signal that clocks the first power domain.

10. The method of claim 9, further comprising clocking, by the external bus, the interface wherein the interface gates off the clock signal to other circuitry in the first power domain until the interface detects a bus transaction directed to the sensor device.

11. A sensor device, comprising:
  an interface that receives requests;
  an updatable information store, coupled to the interface, and situated in a first power domain, the updatable information store responding to a request if the request is directed to the updatable information store;
  a sensor element, situated in a second power domain of the sensor device, that communicates measured parameter information to the updatable information store; and
  a power manager that activates the second power domain in response to the request if the request is a request for measurement of a parameter by the sensor element.

12. The sensor device of claim 11, wherein the power manager maintains the sensor element in an inactive state if the request is other than a request for measurement of a parameter by the sensor element.

13. The sensor device of claim 11, wherein the sensor device updates configuration information in the updatable information store in response to a request received by the interface.

14. The sensor device of claim 11, wherein the updatable information store comprises a remappable register store that includes configuration information for the sensor device.

15. The sensor device of claim 14, wherein the updatable information store responds to an auto-increment request by sending to the interface a block of data starting at an address included in the auto-increment request.

16. The sensor device of claim 11, further comprising:
  a controller coupled to the sensor element to control the sensor element under the direction of a control program, wherein the controller modifies the control program in response to updating configuration information in the updatable information store.

17. The sensor device of claim 16, wherein the controller alters commands to which the sensor device responds thus effectively modifying the interface.

18. The sensor device of claim 11, wherein the first power domain is an always accessible power domain and the second power domain is a sleep/active power domain.

19. The sensor device of claim 11, wherein the interface is configured to operate with an external bus from which the interface receives a clock signal that clocks the first power domain.

20. A system, comprising:
a host processor;
a bus, coupled to the host processor, that transports requests and information for the host processor; and
a sensor device, coupled to the bus, the sensor device including:
an interface that receives requests;
an updatable information store, coupled to the interface, and situated in a first power domain, the updatable information store responding to a request if the request is directed to the updatable information store;
a sensor element, situated in a second power domain of the sensor device, that communicates measured parameter information to the updatable information store; and
a power manager that activates the second power domain in response to receiving the request if the request is a request for measurement of a parameter by the sensor element.

* * * * *